United States Patent
Omino et al.

(10) Patent No.: US 7,549,578 B2
(45) Date of Patent: Jun. 23, 2009

(54) CONTENTS DISTRIBUTION SYSTEM, METHOD THEREOF, ACCOUNTING DEVICE, CONTENTS DISTRIBUTION APPARATUS, AND PROGRAM

(75) Inventors: Takayuki Omino, Tokyo (JP); Michio Nishioka, Tokyo (JP)

(73) Assignee: NEC Corporation, Tokyo (JP)

( * ) Notice: Subject to any disclaimer, the term of this patent is extended or adjusted under 35 U.S.C. 154(b) by 402 days.

(21) Appl. No.: 11/225,042

(22) Filed: Sep. 14, 2005

(65) Prior Publication Data

US 2006/0054689 A1      Mar. 16, 2006

(30) Foreign Application Priority Data

Sep. 15, 2004   (JP)   .............. 2004-268450

(51) Int. Cl.
  *G07F 19/00* (2006.01)
(52) U.S. Cl. .................. 235/381; 235/375
(58) Field of Classification Search ........... 235/375, 235/380, 383, 382, 382.5, 381; 705/26, 12, 705/13, 14, 44, 45
See application file for complete search history.

(56) References Cited

U.S. PATENT DOCUMENTS

| | | | |
|---|---|---|---|
| 7,162,451 B2 * | 1/2007 | Berger et al. ............. 705/51 |
| 7,302,465 B2 * | 11/2007 | Ayres et al. ............. 709/203 |
| 2002/0065732 A1 * | 5/2002 | Rodgers et al. .......... 705/26 |
| 2003/0029911 A1 * | 2/2003 | Kitayama ................ 235/100 |
| 2003/0078986 A1 * | 4/2003 | Ayres et al. ............. 709/217 |
| 2003/0105719 A1 * | 6/2003 | Berger et al. | |
| 2003/0155413 A1 * | 8/2003 | Kovesdi et al. ........... 235/375 |
| 2006/0054689 A1 * | 3/2006 | Omino et al. ............ 235/380 |

FOREIGN PATENT DOCUMENTS

| | | | |
|---|---|---|---|
| JP | 2001-243382 | A | 9/2001 |
| JP | 2002-279212 | A | 9/2002 |
| JP | 2002-0089820 | A | 11/2002 |
| JP | 2002-366793 | A | 12/2002 |
| JP | 2003-22236 | A | 1/2003 |
| JP | 2003-0030586 | A | 4/2003 |
| JP | 2003-187118 | A | 7/2003 |
| JP | 2004-86441 | A | 3/2004 |
| JP | 2004-0055418 | A | 6/2004 |
| KR | 2003-0024152 | A | 3/2003 |
| TW | 511383 | | 11/2002 |
| TW | 532001 | | 5/2003 |
| TW | 571557 | | 1/2004 |
| TW | 579634 | | 3/2004 |

* cited by examiner

*Primary Examiner*—Thien M Le
(74) *Attorney, Agent, or Firm*—Sughrue Mion, PLLC

(57) ABSTRACT

A contents distribution system capable of using contents from a wireless device without using a Kiosk terminal, its method, an accounting device, a contents distribution apparatus, and a program. A wireless device 10 issues a purchase request for contents to a contents server 30. The wireless device 10 accepts payment information about contents based on the payment data of the contents received from the contents server 30 at the purchase request, and transmits payment data to the contents server 30. The contents server 30 transmits the contents to the wireless device 10 by way of the access point 20.

18 Claims, 4 Drawing Sheets

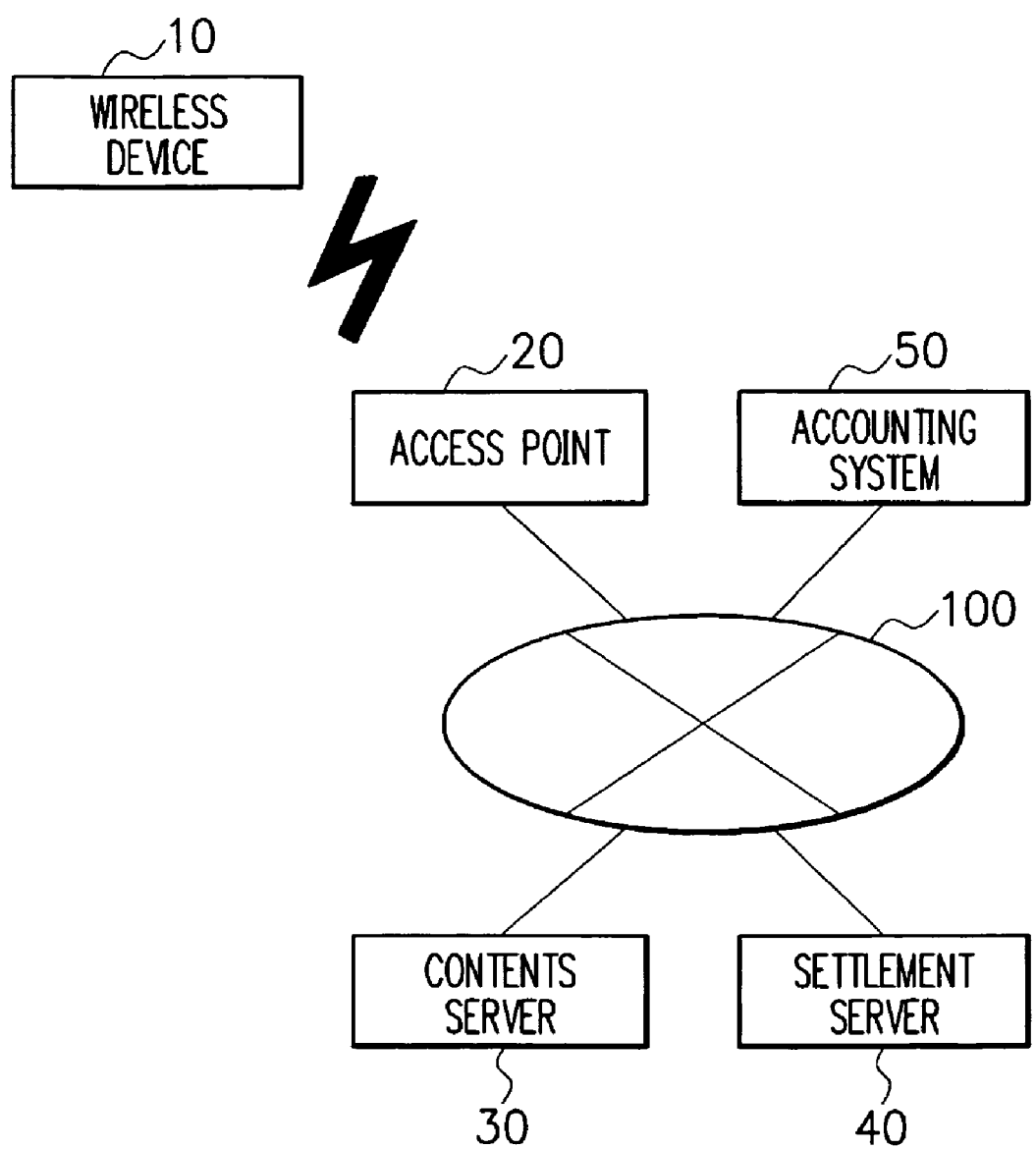
F I G. 1

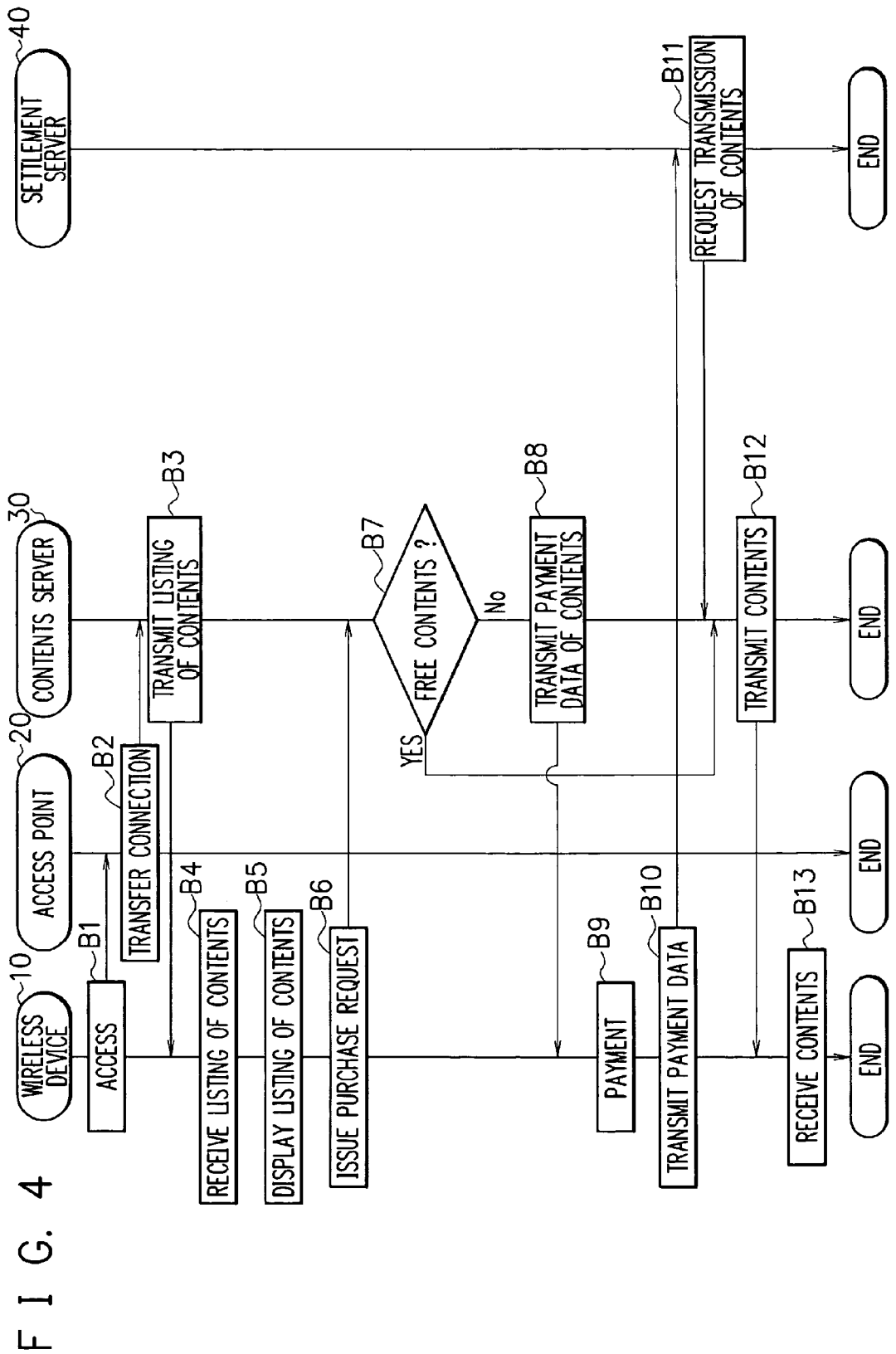

CONTENTS DISTRIBUTION SYSTEM, METHOD THEREOF, ACCOUNTING DEVICE, CONTENTS DISTRIBUTION APPARATUS, AND PROGRAM

BACKGROUND OF THE INVENTION

1. Field of the Invention

The present invention relates to a contents distribution system capable of using contents from a wireless device without using a Kiosk terminal, its method, an accounting device, a contents distribution apparatus, and a program.

2. Description of Related Art

Kiosk terminals (a computer with a touch-screen display that displays information) are often placed in public and commercial facilities (e.g., airports, museums, educational institutions, shopping malls, convenience stores, retail stores, office lobbies, etc.) enabling customers to have instant electronic access to information, products, and/or services. Recent Kiosk terminals have advanced multimedia features such as digital photo printer, Internet terminal, Wi-Fi wireless access point, digital music download station, payment system etc. that allow customers to purchase contents (e.g., music, movies, e-books, software, educational content, advertising, literary works, and other media assets) and conduct financial transactions (ticket reservations, billing and settlement, etc.).

However, there are many problems associated with traditional Kiosk terminals. For example, the cost of starting and operating a Kiosk terminal service is expensive. The costs incurred in a Kiosk terminal business includes the Kiosk terminal purchase or lease fee, setup costs, software installation/customization costs, maintenance costs, floor space rent, etc. Additionally, Kiosk terminals occupy a lot of valuable floor space that can be used for other meaningful and profitable purposes. Also, since only one user can use the Kiosk terminal at a time, Kiosk terminal operators are unable to provide services to multiple users simultaneously, leading to a loss of sales especially during peak hours. Furthermore, since Kiosk terminals are often placed in unmonitored areas, Kiosk terminal operators often have security concerns when providing cash based pay-for-use services, since they may be targets for vandalism and theft.

A technology, where a contents service provider places a Kiosk terminal like system at a public facility and offers customers various types of pay-per-use electronic contents through a pre-paid system, is proposed (for example, Japanese Patent Application Laid-Open No. 2002-279212).

SUMMARY OF THE INVENTION

With the proliferation of advanced wireless devices (e.g., cellular telephones, personal digital assistants (PDAs), smartphones, etc.) out in the market, most wireless devices are now capable of downloading digital contents, run applications, display data and handle financial transactions, capable of processing and conducting transactions comparable that of a typical Kiosk terminal.

Thus it would be advantageous for a Kiosk terminal operator to be able to provide Kiosk terminal services to a user's wireless device without setting up a Kiosk terminal in public and commercial facilities.

As such, there is a need for a method and system that can provide for a Kiosk terminal service to a user without the use of a Kiosk terminal. In addition, there is also a need for a system and method to transmit Kiosk terminal services to a wireless device via a network (e.g., wireless LAN), capable of conducting financial transactions as well.

Accordingly, the present invention aims at providing a contents distribution system capable of using contents through a wireless device without using a Kiosk terminal, a contents distribution method, an accounting device, a contents distribution apparatus, and a program.

The invention according to claim 1 is a contents distribution system including a wireless device, an access point of the wireless device, and an apparatus that is connected to the access point over a network and distributes contents. With the configuration, the wireless device includes: purchase request means for issuing a purchase request for contents to the apparatus; contents reception means for receiving contents from the apparatus; payment information acceptance means for accepting payment information about contents based on payment data of received contents; and payment data transmission means for transmitting the payment data to the apparatus; the apparatus includes: payment data transmission means for transmitting payment data of contents to the wireless device at a purchase request; payment data reception means for receiving payment data; and contents transmission means for transmitting contents to the wireless device; and when the purchase request and the payment data are received by the apparatus from the wireless device, the contents are transmitted.

The invention according to claim 2 is a contents distribution system including a wireless device, an access point of the wireless device, and an apparatus that is connected to the access point over a network and distributes contents. With the configuration, the wireless device includes: purchase request means for issuing a purchase request for contents to the apparatus; contents reception means for receiving contents from the apparatus; payment information input means for inputting payment data certifying a payment; and payment data transmission means for transmitting the payment data to the apparatus; the apparatus includes: payment data transmission means for transmitting payment data of contents to the wireless device at a purchase request; payment data reception means for receiving payment data; and contents transmission means for transmitting contents to the wireless device; and when the purchase request and the payment data are received by the apparatus from the wireless device, the contents are transmitted.

The invention according to claim 3 is a contents distribution system including a wireless device, an access point of the wireless device, an apparatus that is connected to the access point over a network and distributes contents, and a settlement device. With the configuration, the wireless device includes: purchase request means for issuing a purchase request for contents to the apparatus; contents reception means for receiving contents from the apparatus; payment information acceptance means for accepting payment information about contents based on payment data of received contents; and payment data transmission means for transmitting the payment data to the apparatus; the apparatus includes: payment data transmission means for transmitting payment data of contents to the wireless device at a purchase request; request reception means for receiving a contents distribution request from the settlement device; and contents transmission means for transmitting contents to the wireless device; and the settlement device includes: payment data reception means for receiving the payment data; and request means for requesting the apparatus to distribute contents; and when the contents distribution request and the payment data are received by the apparatus from the settlement device, the contents are transmitted.

The invention according to claim 4 is a contents distribution system including a wireless device, an access point of the wireless device, an apparatus that is connected to the access point over a network and distributes contents, and an accounting device. With the configuration, the wireless device includes: purchase request means for issuing a purchase request to the apparatus; and contents reception means for receiving contents from the apparatus; the apparatus includes: payment data transmission means for transmitting payment data of contents to the wireless device and the accounting device at a purchase request; payment data reception means for receiving payment data from the accounting device; and contents transmission means for transmitting contents to the wireless device; the accounting device includes: payment information acceptance means for accepting payment information about contents based on the received payment data of the contents; and payment data transmission means for transmitting the payment data to the apparatus; and when the purchase request is received by the apparatus from the wireless device and the payment data is received by the apparatus from the accounting device, the contents are transmitted.

The invention according to claim 5 is a contents distribution system including a wireless device, an access point of the wireless device, an apparatus that is connected to the access point over a network and distributes contents, an accounting device, and a settlement device. With the configuration, the wireless device includes: purchase request means for issuing a purchase request for contents to the apparatus; and contents reception means for receiving contents from the apparatus; the apparatus includes: payment data transmission means for transmitting payment data of contents to the wireless device and the accounting device at a purchase request; request reception means for receiving a contents distribution request from the settlement device; and contents transmission means for transmitting contents to the wireless device; the accounting device includes: payment information acceptance means for accepting payment information about contents based on the received payment data of the contents; and payment data transmission means for transmitting the payment data to the settlement device; the settlement device includes: payment data reception means for receiving payment data; and request means for requesting the apparatus to distribute contents; and when the purchase request is received by the apparatus from the wireless device and the payment data is received by the apparatus from the accounting device, the contents are transmitted.

The invention according to claim 6 is the contents distribution system based on any of claims 1 to 5. With the configuration, the apparatus further includes a listing transmission means for transmitting a listing of provided contents to the wireless device; the wireless device further includes: listing reception means for receiving a listing of contents transmitted by the listing transmission means; display means for displaying the received listing of the contents; and selection means for selecting the received contents from the displayed listing of the contents.

The invention according to claim 7 is a contents distributing method using a wireless device, an access point of the wireless device, and an apparatus that is connected to the access point over a network and distributes contents. With the configuration, the wireless device includes: a step of connecting to the apparatus over the network; and a step of purchase request means issuing a purchase request for selected contents to the apparatus; the apparatus includes: a step of accepting the purchase request; and a step of payment data transmission means transmitting payment data of contents to the wireless device at the purchase request; the wireless device further includes: a step of payment information acceptance means accepting payment information about the contents based on the received payment data of the contents; and a step of the payment data transmission means transmitting the payment data to the apparatus; and the apparatus further includes a step of a contents transmission means transmitting the contents to the wireless device by way of the access point; and the wireless device further includes a step of contents reception means receiving the contents from the apparatus.

The invention according to claim 8 is a contents distributing method using a wireless device, an access point of the wireless device, and an apparatus that is connected to the access point over a network and distributes contents. With the configuration, the wireless device includes: a step of connecting to the apparatus over the network; and a step of purchase request means issuing a purchase request for selected contents to the apparatus; the apparatus includes: a step of accepting the purchase request; and a step of payment data transmission means transmitting payment data of contents to the wireless device at the purchase request; the wireless device further includes: a step of payment information input means inputting payment data certifying a payment; and a step of the payment data transmission means transmitting the payment data to the apparatus; the apparatus further includes a step of a contents transmission means transmitting the contents to the wireless device by way of the access point; and the wireless device further includes a step of contents reception means receiving the contents from the apparatus.

The invention according to claim 9 is a contents distributing method using a wireless device, an access point of the wireless device, an apparatus that is connected to the access point over a network and distributes contents, and a settlement device. With the configuration, the wireless device includes: a step of connecting to the apparatus over the network; and a step of purchase request means issuing a purchase request for selected contents to the apparatus; the apparatus includes: a step of accepting the purchase request; and a step of payment data transmission means transmitting payment data of contents to the wireless device at the purchase request; the wireless device further includes: a step of payment information acceptance means accepting payment information about the contents based on the received payment data of the contents; and a step of the payment data transmission means transmitting the payment data to the settlement device; the settlement device includes: a step of payment data reception means receiving the payment data; and a step of request means requesting the apparatus to distribute the contents; the apparatus includes: a step of request reception means receiving the request to distribute the contents from the settlement device; and a step of contents transmission means transmitting the contents to the wireless device; and the wireless device further includes a step of contents reception means receiving the contents from the apparatus.

The invention according to claim 10 is a contents distributing method using a wireless device, an access point of the wireless device, an apparatus that is connected to the access point over a network and distributes contents, and an accounting device. With the configuration, the wireless device includes: a step of connecting to the apparatus over the network; and a step of purchase request means issuing a purchase request for selected contents to the apparatus; the apparatus includes: a step of accepting the purchase request; and a step of payment data transmission means transmitting payment data of contents to the wireless device and the accounting device at the purchase request; the accounting device includes: a step of payment information acceptance means accepting payment information about the contents based on the payment data of the received contents; and a step of payment data transmission means transmitting the payment data to the apparatus; the apparatus further includes: a step of payment data reception means receiving the payment data; and a step of contents transmission means transmitting the contents to the wireless device and the accounting device; and the wireless device further includes a step of contents reception means receiving the contents from the apparatus.

The invention according to claim 11 is a contents distributing method using a wireless device, an access point of the wireless device, an apparatus that is connected to the access point over a network and distributes contents, an accounting device, and a settlement device, wherein: the wireless device includes: a step of connecting to the apparatus over the network; and a step of purchase request means issuing a purchase request for selected contents to the apparatus; the apparatus includes: a step of accepting the purchase request; and a step of payment data transmission means transmitting payment data of contents to the wireless device and the accounting device at the purchase request; the accounting device includes: a step of payment information acceptance means accepting payment information about the contents based on the payment data of the received contents; and a step of payment data transmission means transmitting the payment data to the settlement device; the settlement device includes: a step of payment data reception means receiving the payment data; and a step of request means requesting the apparatus to distribute the contents; the apparatus includes: a step of request reception means receiving the request to distribute the contents from the settlement device; and a step of contents transmission means transmitting the contents to the wireless device; and the wireless device further includes a step of contents reception means receiving the contents from the apparatus.

The invention according to claim 12 is based on any of claims 7 to 11. With the configuration, the apparatus further includes a step of listing transmission means transmitting a listing of provided contents to the wireless device; and the wireless device further includes: a step of listing reception means receiving the listing of the contents transmitted by the listing transmission means; a step of display means displaying the received listing of the contents; and a step of selecting contents to be received from the displayed listing of the contents.

The invention according to claim 13 is an accounting device provided with an access point of a wireless device in close vicinity. With the configuration, the access point is connected to an apparatus for distributing contents over a network; and the wireless device includes: purchase request transmission means for transmitting a purchase request issued for contents selected in the wireless device; and contents reception means for receiving the contents from the apparatus; and the accounting device includes: payment information acceptance means for accepting payment information about the contents based on the payment data of the contents received from the apparatus at the purchase request; and payment data transmission means for transmitting the payment data to the apparatus for performing a settlement.

The invention according to claim 14 is a contents distribution apparatus including: payment data transmission means for transmitting payment data of contents to a wireless device at a purchase request issued for the contents through an access point of the wireless device connected over a network by referring to a listing of provided contents; payment data reception means for receiving payment data after completion of a payment procedure; and contents transmission means for transmitting contents to the wireless device by way of the access point.

The invention according to claim 15 is a program for performing by a contents distribution apparatus including: a step of payment data transmission means transmitting payment data of contents to the wireless device at a purchase request issued for the contents through an access point of a wireless device connected over a network; a step of payment data reception means receiving payment data after completion of a payment procedure; and a step of contents transmission means transmitting contents to the wireless device.

The contents distribution system, its method, the accounting device, the contents distribution apparatus, and the program according to the present invention the load of a cost at a facility running side can be reduced without a Kiosk terminal.

BRIEF DESCRIPTION OF THE DRAWINGS

The objects and features of the present invention will become more apparent from the consideration of the following detailed description taken in conjunction with the accompanying drawings, in which:

FIG. 1 shows the general configuration of a contents distribution system according to the first embodiment of the present invention;

FIG. 4 shows the sequence of the processing operation in which contents are purchased and distributed in the second embodiment of the present invention.

DESCRIPTION OF THE PREFERRED EMBODIMENTS

Figure 2:
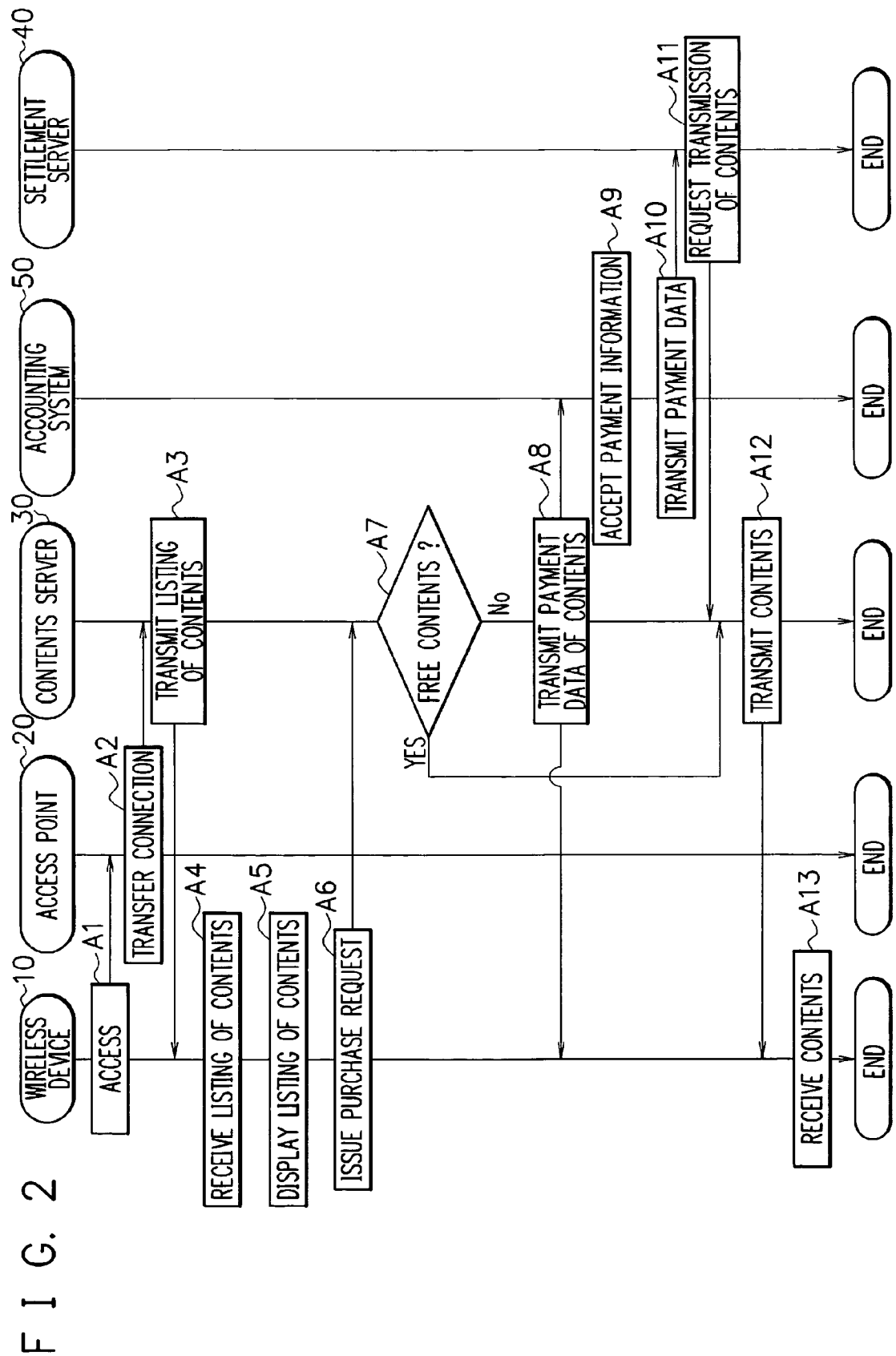
FIG. 2 shows the sequence of the processing operation in which contents are purchased and distributed in the first embodiment of the present invention.

The configuration according to an embodiment of the present invention is explained below by referring to the attached drawings.

By referring to FIG. 1, the contents distribution system according to the present invention is configured by a wireless device 10, an access point 20, a contents server 30, a settlement server 40, and an accounting system 50. In the configuration, the access point 20, the contents server 30, the settlement server 40, and the accounting system 50 are connected over a network 100. The network 100 can be an arbitrary network, for example, an optical fiber, the Internet, a public line, a LAN (local area network), an ADSL (asymmetric digital subscriber line), and the like. The communication method can be a cable method or a wireless method.

The access point 20, the network 100, and the accounting system 50 are mounted in each of the commercial and public facilities such as retail shops, supermarkets, convenience stores, department stores, municipalities, hotels, theme parks, medical organizations, traffic facilities (airports, stations, bus terminals), and the like, but the place in which each device is mounted is not specified.

The contents server 30 and the settlement server 40 are mounted in the facilities such as a data center and the like operated by, for example, a platform company, but the place in which each device is mounted is not specified.

The wireless device 10 is an information processing device of wireless communication equipment such as a mobile telephone, an on-vehicle terminal, a PDA (personal digital assistant), a personal computer, and the like, and is loaded with a communication module such as a wireless LAN, and the like.

When a user issues a request to establish wireless communications in the communication area with the access point 20, the wireless device 10 authenticates a user, and when the authenticating operation is completed, the wireless device 10 can be uniquely identified. In the communication area, the authentication can be completed by the wireless device 10 and the access point 20 automatically performing the authenticating operation.

The wireless device 10 is connected to the contents server 30 by way of the access point 20 over the network 100, displays various contents on the screen of the display or the like as a predetermined display unit, and browses and purchases the various displayed contents. Various contents can be, for example, software, map data, book data, magazine data, newspaper data, music data, video data, game data, coupon information, recruitment information, part-time job information, guide information, reservation data, payment/settlement data, service application data, and the like. Goods are displayed with relevant information including the name, model number, goods number, price and the like of a product.

The access point 20 is an electromagnetic wave repeater for connection between terminals through a wireless LAN and the like. A plurality of users can simultaneously access the access point 20. The access point 20 can be connected to the contents server 30 over the network 100. Although the access point 20 includes the authentication function of the wireless device 10, the authentication function can be performed by an independent and dedicated authentication server.

The contents server 30 includes various kinds of data, information, contents, applications, and the like. For example, it is an information processing device such as a work station or the like. It has the function of receiving purchase order information transmitted by the wireless device 10 and transmitting various ordered contents to the wireless device 10. Various contents can be, for example, software, map data, book data, magazine data, newspaper data, music data, video data, game data, coupon information, recruitment information, part-time job information, guide information, reservation data, payment/settlement data, service application data and others. Goods are displayed with relevant information including name, model number, goods number, price, and the like of a product.

The settlement server 40 is an information processing device for performing accounting operations on various contents purchased by a user, acting as a collector for a contents provider. The settlement server 40 has the function of receiving payment data of various contents purchased by a user and allowing the contents server 30 to transmit various contents to the wireless device 10.

The accounting system 50 is a system provided in a facility, and has the function of transferring the settlement information to the settlement server 40 when a user pays for a value prescribed by the payment data of various contents purchased by the user. The accounting system 50 is, for example, what is called a cash register, and can have the function of receiving payments in cash or the like for various contents purchased by users and transmitting the payment information about the cash or the like received from a user to a settlement server.

Next, the flowchart of the contents distribution and the settlement process is explained below in detail by referring to FIG. 2.

First, when a user carrying the wireless device 10 enters a facility, and the wireless device 10 enters an area in which communications with the access point 20 can be established, the access point 20 is displayed on the screen as a predetermined display unit of the wireless device 10, and the wireless device 10 is connected to the access point 20 (step A1). Thus, unlike using a network such as the Internet and the like, a communication fee is not required. When a plurality of access points are provided in a facility, and communications can be established with the plurality of access points, the user can select on the screen of the wireless device 10 an access point which the user wishes to access.

When the access point 20 authenticates a user for uniquely identifying the wireless device 10 to complete an authenticating operation, the access point 20 can also have an independent and dedicated authentication with an authenticating function to perform an authenticating process with the wireless device 10 in addition to the authenticating function contained in the access point.

Next, the access point 20 connects the wireless device 10 to the contents server 30 over the network 100 (step A2).

In response to this, the contents server 30 transmits to the wireless device 10 over the network 100 a listing of various contents to be provided (step A3).

The wireless device 10 receives the listing of various contents from the contents server 30 over the network 100 (step A4).

The wireless device 10 displays the received listing of various contents on the screen (step A5). Thus, various contents are displayed on the screen, and the user can browse them on the screen.

When a user requests to purchase contents, the user selects the contents on the screen, and issues a request to purchase the contents to the contents server 30 over the network 100 by pressing a predetermined button or other operations (step A6).

The contents server 30 determines whether the contents to be purchased are free or pay (step A7). The determination can be made by detecting whether or not a flag provided for each content contained in a purchase request is on.

When it is determined that the contents related to the purchase request are free contents (YES in step A7), the contents server 30 transmits and distributes the contents related to the purchase request to the wireless device 10 over the network 100 (step A12).

When it is determined that the contents related to the purchase request are pay contents (NO in step A7), the contents server 30 transmits payment data of the contents to the wireless device 10 and the accounting system 50 (step A8). The payment data of the contents includes, for example, data such as identification information about the wireless device that placed the order, the type, the quantity, and the price of the ordered goods.

The accounting system 50 receives the payment information about the pay contents based on the payment data of the contents received in step A8 (step A9). For example, payment information can be accepted by reading of a predetermined card designed for the use of electronic money, a credit card or the like, and by a user going to the register in a facility, giving cash to a staff of a shop, and making a payment for various contents, thereby a shop staff pressing a predetermined key. An ID number or the like for identification of the wireless device 10 can also be accepted. An ID number or the like for identification of the wireless device 10 can be determined after the accounting system 50 or the settlement server 40 accepts the payment information about the pay contents.

The accounting system 50 transmits payment data to the settlement server 40 over the network 100 (step A10).

When the settlement server 40 receives payment data, it confirms the payment and requests the contents server 30 to distribute various contents (step A11).

The contents server 30 receives the request to distribute various contents from the settlement server 40, and transmits various contents data to the wireless device 10 by way of the access point 20 in the facility (step A12). The wireless device 10 can be identified by an ID number or the like.

The wireless device 10 receives various contents from the contents server 30 (step A13).

Figure 3:
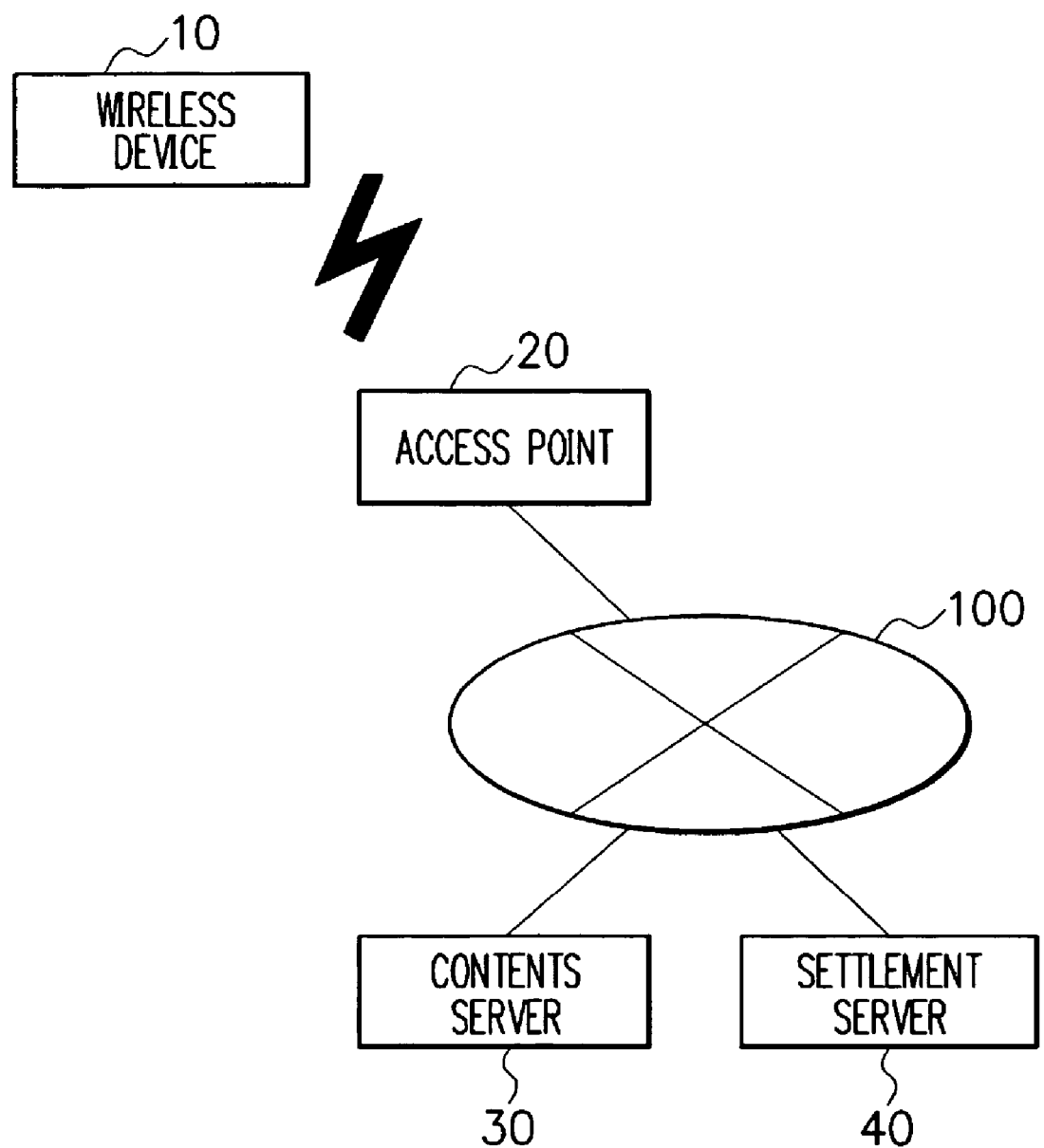
FIG. 3 shows the general configuration of a contents distribution system according to the second embodiment of the present invention.

Another embodiment of the present invention is explained below in detail by referring to FIG. 3.

In the present embodiment, after a user uses the wireless device 10 and transmits a purchase order of various contents to the contents server 30, the user directly makes payment using the wireless device 10 without the accounting system 50, which is a difference from the above-mentioned embodiment.

The operation of the present embodiment is described below in detail by referring to FIG. 2.

If the wireless device 10 issues a purchase request for various contents, and the contents server 30 determines that the contents relating to the purchase request are pay contents, then the operations (steps B1 to B8) performed until the payment data of the contents are transmitted to the wireless device 10 are basically the same as in the above-mentioned embodiment except that the payment data of the contents is transmitted only to the wireless device 10.

Then, the wireless device 10 asks a provider with whom a contract is made to make payment on behalf of the user, or payment for various contents is made by an electronic settlement using a credit card, a transfer through a bank and the like. (step B9).

The wireless device 10 transmits payment data to the settlement server 40 over the network 100 (step B10).

The subsequent operations, that is, the settlement server 40 confirming received money and requesting the contents server 30 to distribute various contents, and the contents server 30 transmitting various contents to the wireless device 10 by way of the access point 20 in each facility over the network 100 (steps B11 to B13), are the same as the operations in the above-mentioned embodiment.

As described above, according to the present embodiment, a user can make payment by an electronic settlement through the wireless device 10. Thereby the convenience is improved.

In step B9 above, payment data certifying payment can be input to the wireless device 10 by pressing a predetermined button or other operations. The settlement of payment can be performed either on-line or off-line by a user.

Each of the above-mentioned embodiments is a preferred embodiment of the present invention, and it is possible to make various alterations to each embodiment within the gist of the present invention. For example, by each device reading and executing a program for realizing the functions of the contents server 30, the settlement server 40, the accounting system 50 and others, the function of the present system can be realized. Furthermore, the program can be transmitted to another computer system through a transmission wave via a transmission medium such as the Internet, a telephone line, and the like through CD-ROM, a magnetic optical disk, etc. as a computer-readable recording medium.

Each of the above-mentioned embodiments is explained by referring to the system configuration in which the access point 20, the contents server 30, the settlement server 40, the accounting system 50, and others are connected as individual devices. However, it is obvious that the present invention can be applied to the configuration in which each function is realized as a computer system or a plurality of server devices are added for each function.

A shop staff in a facility can directly issue to the contents server 30 an instruction to transmit various contents to the wireless device 10 using an information processing device such as a personal computer terminal or the like connected to the contents server 30 through a network in contrast to the case where the accounting system 50 transmits a settlement to the settlement server 40, the settlement server 40 contacts the contents server 30, and the contents server 30 sends various contents to the wireless device 10 by way of the network 100 and the access point 20.

What is claimed is:

1. A contents distribution system including a wireless device, an access point of the wireless device, and an apparatus that is connected to the access point over a network and distributes contents, wherein:
   the wireless device comprises:
      purchase request means for issuing a purchase request for desired contents to the apparatus;
      contents reception means for receiving the desired contents from the apparatus;
      payment information acceptance means for accepting payment information about the desired contents based on payment data of the desired contents; and
      payment data transmission means for transmitting the payment data of the desired contents to the apparatus;
   the apparatus comprises:
      payment data transmission means for transmitting payment data of the desired contents to the wireless device at a purchase request;
      payment data reception means for receiving payment data; and
      contents transmission means for transmitting the desired contents to the wireless device; and
   wherein the desired contents are transmitted based on a receipt of the purchase request and the payment data by the apparatus from the wireless device.

2. A contents distribution system including a wireless device, an access point of the wireless device, and an apparatus that is connected to the access point over a network and distributes contents, wherein:
   the wireless device comprises:
      purchase request means for issuing a purchase request for desired contents to the apparatus;
      contents reception means for receiving the desired contents from the apparatus;
      payment information input means for inputting payment data of the desired contents, certifying a payment; and
      payment data transmission means for transmitting the payment data of the desired contents to the apparatus;
   the apparatus comprises:
      payment data transmission means for transmitting payment data of the desired contents to the wireless device at a purchase request;
      payment data reception means for receiving the payment data; and
      contents transmission means for transmitting the desired contents to the wireless device; and
   wherein the desired contents are transmitted based on a receipt of the purchase request and the payment data by the apparatus from the wireless device.

3. A contents distribution system including a wireless device, an access point of the wireless device, an apparatus that is connected to the access point over a network distributes contents, and a settlement device, wherein:
   the wireless device comprises:
      purchase request means for issuing a purchase request for desired contents to the apparatus;
      contents reception means for receiving the desired contents from the apparatus;

payment information acceptance means for accepting payment information about the desired contents based on payment data of the received desired contents; and payment data transmission means for transmitting the payment data to the apparatus;

the apparatus comprises:

payment data transmission means for transmitting payment data of the desired contents to the wireless device at a purchase request;

request reception means for receiving a contents distribution request from the settlement device; and contents transmission means for transmitting the desired contents to the wireless device; and the settlement device comprises:

payment data reception means for receiving the payment data; and request means for requesting the apparatus to distribute the desired contents; and wherein the desired contents are transmitted based on a receipt of the contents distribution request and the payment data by the apparatus from the settlement device.

4. A contents distribution system including a wireless device, an access point of the wireless device, an apparatus which is connected to the access point over a network and distributes contents, and an accounting device wherein:

the wireless device comprises:

purchase request means for issuing a purchase request for desired contents to the apparatus; and contents reception means for receiving the desired contents from the apparatus;

the apparatus comprises:

payment data transmission means for transmitting payment data of the desired contents to the wireless device and the accounting device at a purchase request;

payment data reception means for receiving the payment data from the accounting device; and contents transmission means for transmitting the desired contents to the wireless device;

the accounting device comprises:

payment information acceptance means for accepting payment information about the desired contents based on the received payment data of the desired contents; and payment data transmission means for transmitting the payment data to the apparatus; and wherein the desired contents are transmitted based on a receipt by the apparatus of the purchase request from the wireless device and the payment data from the accounting device.

5. A contents distribution system including a wireless device, an access point of the wireless device, an apparatus that is connected to the access point over a network and distributes contents, an accounting device, and a settlement device, wherein:

the wireless device comprises:

purchase request means for issuing a purchase request for desired contents to the apparatus; and contents reception means for receiving the desired contents from the apparatus; the apparatus comprises:

payment data transmission means for transmitting payment data of the desired contents to the wireless device and the accounting device at a purchase request;

request reception means for receiving a contents distribution request from the settlement device; and contents transmission means for transmitting the desired contents to the wireless device;

the accounting device comprises:

payment information acceptance means for accepting payment information about the desired contents based on the received payment data of the desired contents; and payment data transmission means for transmitting the payment data to the settlement device;

the settlement device comprises:

payment data reception means for receiving payment data; and request means for requesting the apparatus to distribute the desired contents; and wherein the desired contents are distributed based on a receipt by the apparatus of the purchase request from the wireless device and the payment data from the accounting device.

6. The contents distribution system according to any of claims 1 to 5, wherein:

the apparatus further comprises a listing transmission means for transmitting a listing of provided contents to the wireless device;

the wireless device further comprises:

listing reception means for receiving a listing of the provided contents transmitted by the listing transmission means;

display means for displaying the received listing of the provided contents; and selection means for selecting the desired contents from the displayed listing of the provided contents.

7. A contents distributing method using a wireless device, an access point of the wireless device, and an apparatus that is connected to the access point over a network and distributes contents, wherein:

the wireless device comprises:

a step of connecting to the apparatus over the network; and a step of purchase request means issuing a purchase request for desired contents to the apparatus;

the apparatus comprises:

a step of accepting the purchase request; and a step of payment data transmission means transmitting payment data of the desired contents to the wireless device at the purchase request;

the wireless device further comprises:

a step of payment information acceptance means accepting payment information about the desired contents based on the received payment data of the desired contents; and a step of the payment data transmission means transmitting the payment data to the apparatus; and the apparatus further comprises a step of a contents transmission means transmitting the desired contents to the wireless device by way of the access point; and the wireless device further comprises a step of contents reception means receiving the desired contents from the apparatus.

8. A contents distributing method using a wireless device, an access point of the wireless device, and an apparatus that is connected to the access point over a network and distributes contents, wherein:

the wireless device comprises:

a step of connecting to the apparatus over the network; and a step of purchase request means issuing a purchase request for desired contents to the apparatus;

the apparatus comprises:

a step of accepting the purchase request; and a step of payment data transmission means transmitting payment data of the desired contents to the wireless device at the purchase request;

the wireless device further comprises:

a step of payment information input means inputting the payment data of the desired contents certifying a payment; and a step of the payment data transmission means transmitting the payment data of the desired contents to the apparatus;

the apparatus further comprises a step of a contents transmission means transmitting the desired contents to the wireless device by way of the access point; and the wireless device further comprises a step of contents reception means receiving the desired contents from the apparatus.

9. A contents distributing method using a wireless device, an access point of the wireless device, an apparatus that is connected to the access point over a network and distributes contents, and a settlement device, wherein:

the wireless device comprises:

a step of connecting to the apparatus over the network; and a step of purchase request means issuing a purchase request for desired contents to the apparatus;

the apparatus comprises:

a step of accepting the purchase request; and a step of payment data transmission means transmitting payment data of the desired contents to the wireless device at the purchase request;

the wireless device further comprises:

a step of payment information acceptance means accepting payment information about the desired contents based on the received payment data of the desired contents; and a step of the payment data transmission means transmitting the payment data of the desired contents to the settlement device;

the settlement device comprises:

a step of payment data reception means receiving the payment data of the desired contents; and a step of request means requesting the apparatus to distribute the desired contents; the apparatus comprises:

a step of request reception means receiving the request to distribute the desired contents from the settlement device; and a step of contents transmission means transmitting the desired contents to the wireless device; and the wireless device further comprises a step of contents reception means receiving the desired contents from the apparatus.

10. A contents distributing method using a wireless device, an access point of the wireless device, an apparatus that is connected to the access point over a network and distributes contents, and an accounting device, wherein:

the wireless device comprises:

a step of connecting to the apparatus over the network; and a step of purchase request means issuing a purchase request for desired contents to the apparatus;

the apparatus comprises:

a step of accepting the purchase request; and a step of payment data transmission means transmitting payment data of the desired contents to the wireless device and the accounting device at the purchase request; the accounting device comprises:

a step of payment information acceptance means accepting payment information about the desired contents based on the payment data of the received desired contents; and a step of payment data transmission means transmitting the payment data of the desired contents to the apparatus;

the apparatus further comprises:

a step of payment data reception means receiving the payment data of the desired contents; and a step of contents transmission means transmitting the desired contents to the wireless device and the accounting device; and the wireless device further comprises a step of contents reception means receiving the desired contents from the apparatus.

11. A contents distributing method using a wireless device, an access point of the wireless device, an apparatus that is connected to the access point over a network and distributes contents, an accounting device, and a settlement device, wherein:

the wireless device comprises:

a step of connecting to the apparatus over the network; and a step of purchase request means issuing a purchase request for desired contents to the apparatus;

the apparatus comprises:

a step of accepting the purchase request; and a step of payment data transmission means transmitting payment data of the desired contents to the wireless device and the accounting device at the purchase request; the accounting device comprises:

a step of payment information acceptance means accepting payment information about the desired contents based on the payment data of the desired contents; and a step of payment data transmission means transmitting the payment data of the desired contents to the settlement device;

the settlement device comprises:

a step of payment data reception means receiving the payment data; of the desired contents and a step of request means requesting the apparatus to distribute the desired contents; the apparatus comprises:

a step of request reception means receiving the request to distribute the desired contents from the settlement device; and a step of contents transmission means transmitting the desired contents to the wireless device; and the wireless device further comprises a step of contents reception means receiving the desired contents from the apparatus.

12. The contents distributing method according to any of claims 7 to 11, wherein:

the apparatus further comprises a step of listing transmission means transmitting a listing of provided contents to the wireless device; and the wireless device further comprises:

a step of listing reception means receiving the listing of the provided contents transmitted by the listing transmission means;

a step of display means displaying the received listing of the provided contents; and a step of selecting the desired contents to be received from the displayed listing of the provided contents.

13. An accounting device provided with an access point of a wireless device in close vicinity, wherein:
the access point is connected to an apparatus for distributing contents over a network; and
the wireless device comprises:
purchase request transmission means for transmitting a purchase request issued for desired contents selected in the wireless device; and
contents reception means for receiving the desired contents from the apparatus; and
the accounting device comprises:
payment information acceptance means for accepting payment information about the desired contents based on the payment data of the desired contents received from the apparatus at the purchase request; and
payment data transmission means for transmitting the payment data to the apparatus for performing a settlement.

14. A contents distribution apparatus, comprising:
payment data transmission means for transmitting payment data of desired contents to a wireless device at a purchase request issued for the desired contents through an access point of the wireless device connected over a network by referring to a listing of provided contents;
payment data reception means for receiving payment data after completion of a payment procedure; and
contents transmission means for transmitting the desired contents to the wireless device by way of the access point.

15. A computer-readable medium comprising software instructions for a method for a contents distribution apparatus, the method comprising:
a step of payment data transmission means transmitting payment data of desired contents to the wireless device at a purchase request issued for the desired contents through an access point of a wireless device connected over a network;
a step of payment data reception means receiving payment data after completion of a payment procedure; and
a step of contents transmission means transmitting desired contents to the wireless device.

16. A digital contents distribution method comprising:
connecting a wireless device to an apparatus over a wireless network;
transmitting a purchase request for desired digital contents from the wireless device to the apparatus;
transmitting payment data information for the desired contents from the apparatus to the wireless device;
transmitting payment data for the desired contents from the wireless device to the apparatus;
receiving the payment data for the desired contents from the wireless device at the apparatus;
upon receipt of the payment data, transmitting the desired contents from the apparatus to the wireless device via an access point.

17. A digital contents distribution method comprising:
connecting a wireless device to an access point;
transmitting a purchase request for desired digital contents from the wireless device to a contents server via the access point and a wireless network;
receiving, at an accounting system, acceptance of payment for the desired digital contents, via a predetermined key;
transmitting payment data for the desired digital contents from the accounting system to the contents server via the wireless network;
upon receipt of the payment data, transmitting the desired digital contents from the contents server to the wireless device via the access point and the wireless network.

18. A digital contents distribution method comprising:
displaying a plurality of available access points on a display of a wireless device;
receiving at the wireless device a user selection of one of the plurality of access points;
connecting the wireless device to the selected access point;
transmitting a purchase request and payment data for desired digital contents from the wireless device to an apparatus via the access point and a wireless network;
transmitting the desired digital contents from the apparatus to the wireless device via the access point and the wireless network.

* * * * *